(12) United States Patent
Ronne et al.

(10) Patent No.: US 7,862,947 B2
(45) Date of Patent: Jan. 4, 2011

(54) FAULT MANAGEMENT IN A FUEL CELL-BASED SYSTEM

(75) Inventors: Jerome Ronne, Burnaby (CA); Rasvan Catalin Mihai, Vancouver (CA); Minjie Shi, Burnaby (CA)

(73) Assignee: Plug Power Inc., Latham, NY (US)

( * ) Notice: Subject to any disclaimer, the term of this patent is extended or adjusted under 35 U.S.C. 154(b) by 739 days.

(21) Appl. No.: 11/823,554

(22) Filed: Jun. 28, 2007

(65) Prior Publication Data

US 2008/0014484 A1 Jan. 17, 2008

Related U.S. Application Data

(60) Provisional application No. 60/806,098, filed on Jun. 28, 2006.

(51) Int. Cl.
*H01M 8/04* (2006.01)
(52) U.S. Cl. .................. 429/430; 429/428; 429/429; 429/431; 429/432; 429/433
(58) Field of Classification Search .............. 429/12, 429/22, 23, 428, 429, 430, 431, 432, 433
See application file for complete search history.

(56) References Cited

U.S. PATENT DOCUMENTS

| 6,787,259 B2 * | 9/2004 | Colborn et al. ............ 429/23 |
| 2007/0237993 A1 * | 10/2007 | Carlsson et al. ........... 429/17 |

* cited by examiner

*Primary Examiner*—Patrick Ryan
*Assistant Examiner*—Julian Mercado
(74) *Attorney, Agent, or Firm*—Trop, Pruner & Hu, P.C.

(57) ABSTRACT

A system includes a fuel cell stack, a power communication path, a first controller and a second controller. The fuel cell stack generates electrical power, and the power communication path is coupled between the fuel cell stack and a load of the system to communicate the electrical power to the load. The power communication path includes a switch, which is operable to selectively couple the fuel cell stack to the load and isolate the fuel cell stack from the load. The first controller has a first response time to control the fuel cell stack and control the power communication path. The second controller has a second response time, which is significantly less than the first response time to monitor the power communication path for a fault condition and take corrective action in response to detecting the fault condition.

22 Claims, 7 Drawing Sheets

FAULT MANAGEMENT IN A FUEL CELL-BASED SYSTEM

This application claims the benefit under 35 U.S.C. §119 (e) to U.S. Provisional Application No. 60/806,098, entitled "FUEL CELL POWER UNIT PROTECTION," which was filed on Jun. 28, 2006, and is hereby incorporated by reference in its entirety.

BACKGROUND

The invention generally relates to fault management in a fuel cell-based system.

A fuel cell is an electrochemical device that converts chemical energy directly into electrical energy. There are many different types of fuel cells, such as a solid oxide fuel cell (SOFC), a molten carbonate fuel cell, a phosphoric acid fuel cell, a methanol fuel cell and a proton exchange membrane (PEM) fuel cell.

As a more specific example, a PEM fuel cell includes a PEM membrane, which permits only protons to pass between an anode and a cathode of the fuel cell. A typical PEM fuel cell may employ polysulfonic-acid-based ionomers and operate in the 50° Celsius (C) to 75° temperature range. Another type of PEM fuel cell may employ a phosphoric-acid-based polybenziamidazole (PBI) membrane that operates in the 150° to 200° temperature range.

At the anode of the PEM fuel cell, diatomic hydrogen (a fuel) ionizes to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$H_2 \rightarrow 2H^+ + 2e^-$ at the anode of the cell, and      Equation 1

$O_2 + 4H^+ + 4e^- \rightarrow 2H_2O$ at the cathode of the cell.      Equation 2

A typical fuel cell has a terminal voltage near one volt DC. For purposes of producing much larger voltages, several fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells. Catalyzed electrically conductive gas diffusion layers (GDLs) may be located on each side of each PEM to form the anode and cathodes of each fuel cell. In this manner, reactant gases from each side of the PEM may leave the flow channels and diffuse through the GDLs to reach the PEM.

SUMMARY

In an embodiment of the invention, a system includes a fuel cell stack, a power communication path, a first controller and a second controller. The fuel cell stack generates electrical power, and the power communication path is coupled between the fuel cell stack and a load of the system to communicate the electrical power to the load. The power communication path includes a switch, which is operable to selectively couple the fuel cell stack to the load and isolate the fuel cell stack from the load. The first controller has a first response time to control the fuel cell stack and control the power communication path. The second controller has a second response time, which is significantly less than the first response time to monitor the power communication path for a fault condition and take corrective action in response to detecting the fault condition.

In another embodiment of the invention, a technique includes providing a power communication path to communicate electrical power from a fuel cell stack to a load. The power communication path includes a switch, which is operable to selectively couple the fuel cell stack to the load and isolate the fuel cell stack from the load. The technique includes providing a first controller that has a first response to control the fuel cell stack and control the power communication path. The technique also includes providing a second controller that has a second response time that is significantly less than the first response time to monitor the power communication for a fault condition and take corrective action in response to detecting the fault condition.

Advantages and other features of the invention will become apparent from the following drawing, description and claims.

DETAILED DESCRIPTION

Dealing with possible system faults in a fuel cell power system typically presents challenges related to identifying critical system faults and managing the protection safety of the fuel cell power system. Based on system normal functionality, a comprehensive fault management evaluation analysis (FMEA) identifies the most probable failure modes in a single component fail scenario. There are also cases where a single fault may not be a problem by itself but may drive to some other unknown faults depending on the system state. These other faults may not be captured in the initial component level FMEA and may be even overlooked by designers. Basic system functions are also considered and limit conditions are set in place to prevent major system damage, which is created in a single component fault scenario. Multiple protections are usually used in a fuel cell power system. These protections may include shutting down the fuel cell system based on over and under temperatures (battery temperature, stack temperature, etc.); over and under voltages; over current; minimum or maximum pressures (anode pressure, for example); minimum or maximum flows; and hydrogen status, as just a few examples.

Figure 1:
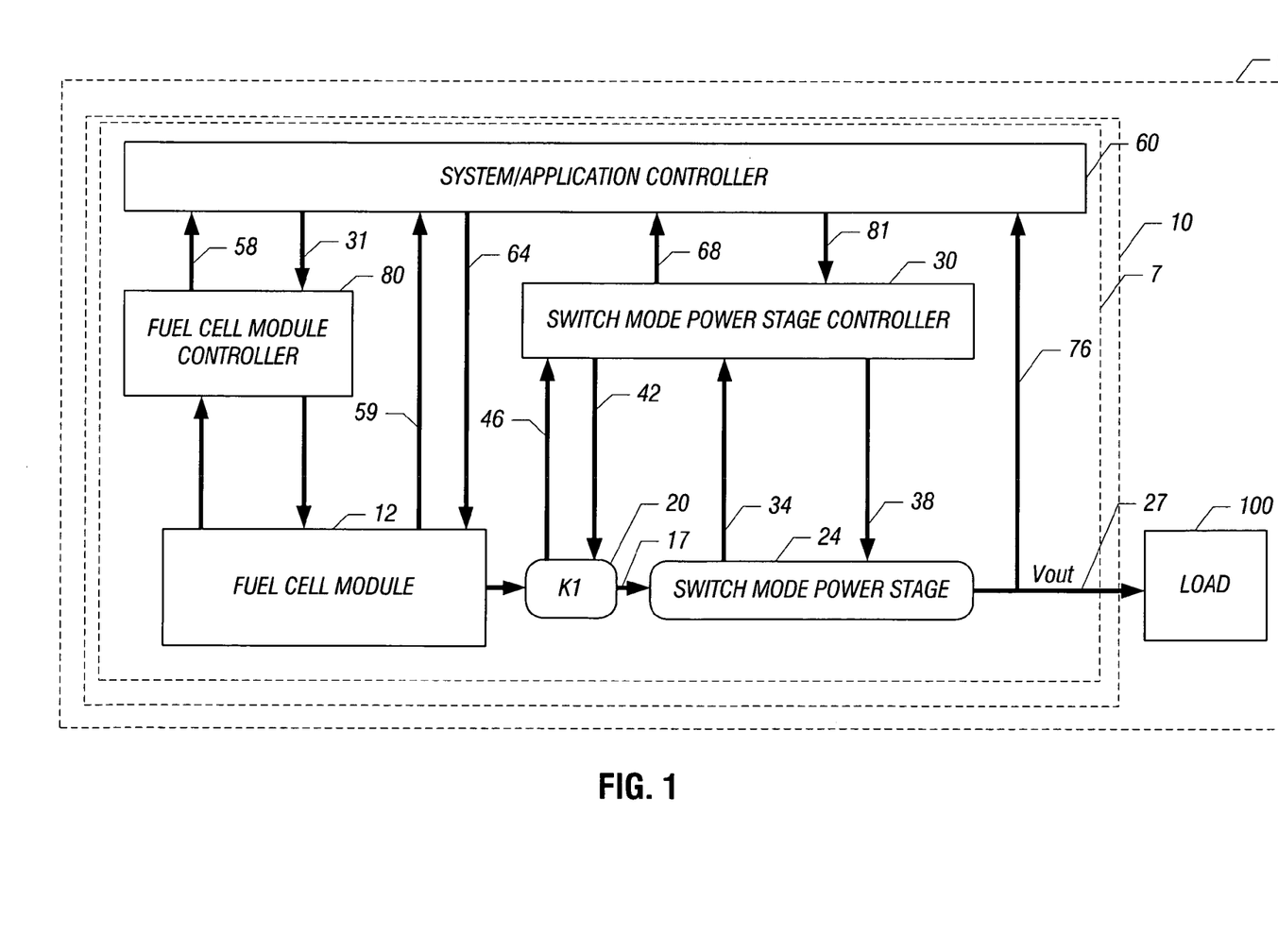
FIG. 1 is a schematic diagram of a system according to an embodiment of the invention.

Referring to FIG. 1, an embodiment 10 of a fuel cell-based system in accordance with the invention includes a fuel cell module 12 that produces electrical power, which is consumed by an external load 100. In this regard, the fuel cell module 12 may include a fuel cell stack, which promotes electrochemical reactions in response to fuel and oxidant flows through the stack. The electrical power that is produced by the fuel cell module 12 is routed through a power communication path, which includes a power communication control switch 20 and a switch mode power stage 24.

The switch mode power stage 24, in accordance with embodiments of the invention, is a switching regulator that converts the power that is generated by the fuel cell module 12 into the appropriate DC or AC level (depending on the load 100) for the load 100. During normal operation of the system 10, the switch 20 is closed to establish electrical communication between output terminals 16 of the fuel cell module 12 and input terminals 17 of the switch mode power stage 24. Thus, during the normal mode of operation, the switch mode power stage 24 converts its input voltage to the appropriate voltage level, which appears on its output terminals 27 that are electrically coupled to the load 100. Should a fault condition, however, be detected in the system 10, the system 10 opens the switch 20 to decouple, or isolate, the fuel cell module 12 from the switch mode power stage 24.

For purposes of rapidly detecting faults and quickly responding to detected faults, the control subsystem for the system 10 is divided into three controllers: a relatively slow software-based system controller 60; and relatively faster, hardware-based controllers 30 and 80. Due to their faster response times, the controllers 30 and 80 have the ability to quickly detect faults and take corrective actions in response to such detections. In some embodiments of the invention, the controllers 30 and 80 may have a response time on the order of one millisecond (ms), which is significantly less than a one hundred millisecond response time (as a comparative example) of the system controller 60. Thus, the software used connection with the controller 60 permits a relatively flexible design in order to handle slowly acting fault detection and corrections. Although the fault protections that are gained by the controllers 30 and 80 are not as flexible, the controllers 30 and 80 provide significantly faster protection due to their grounding in hardware.

In accordance with some embodiments of the invention, the controller 30 controls operations of the switch mode power stage 24, controls the open/closed state of the switch 20 and detects fault conditions, which may arise in the power communication path between the fuel cell module 12 and the load 100, such as fault conditions in the switch mode stage 24 and/or the switch 20. Upon detecting a fault, the controller 30 opens the switch 20.

As a more specific example, in accordance with some embodiments of the invention, the switch mode power stage 24 is a switching regulator, which receives (via communication lines 38) pulse width modulation (PWM) signals for purposes of controlling the switching transistors of the switch mode power stage 24. In this regard, the switch mode power stage 24 furnishes such parameters as the input voltage, output voltage, input current, output current and temperature of the switch mode power stage 24 to the controller 30 via communication lines 34. Based on at least some of these parameters, the controller 30 makes adjustments in the duty cycle of the PWM signals for purposes of regulating the switch mode power stage's input current. This information also allows the controller 30 to detect the occurrence of a possible fault. If a fault is detected, the controller 30 (via a communication line 42) disables the switch 20 to therefore open the switch and isolate the fuel cell module 12 from the switch mode power stage 24. The controller 30 also receives (via communication lines 46) signals from the switch 20, which the controller 30 uses to monitor the health of the switch 20 and determine whether a fault has occurred with the switch 20.

In accordance with some embodiments of the invention, the system 10 and load 100 may be portable, or mobile, and more particularly may be (as an example) part of a motor vehicle 5 (a car, truck, airplane, etc.). Thus, the system 10 may serve as at least part of the power plant (represented by the load 100) of the vehicle. In other embodiments of the invention, the system 10 and load 100 may be part of a stationary system. For example, the fuel cell system 10 may supply all or part of the power needs of a house, electrical substation, backup power system, etc. Additionally, the system 10 may supply thermal energy to a thermal energy consuming load (water heater, water tank, heat exchanger, etc.), and thus, electrical as well as thermal loads to the system are envisioned. Therefore, many different applications of the system and loads that consume energy from the system are contemplated and are within the scope of the appended claims.

Figure 2:
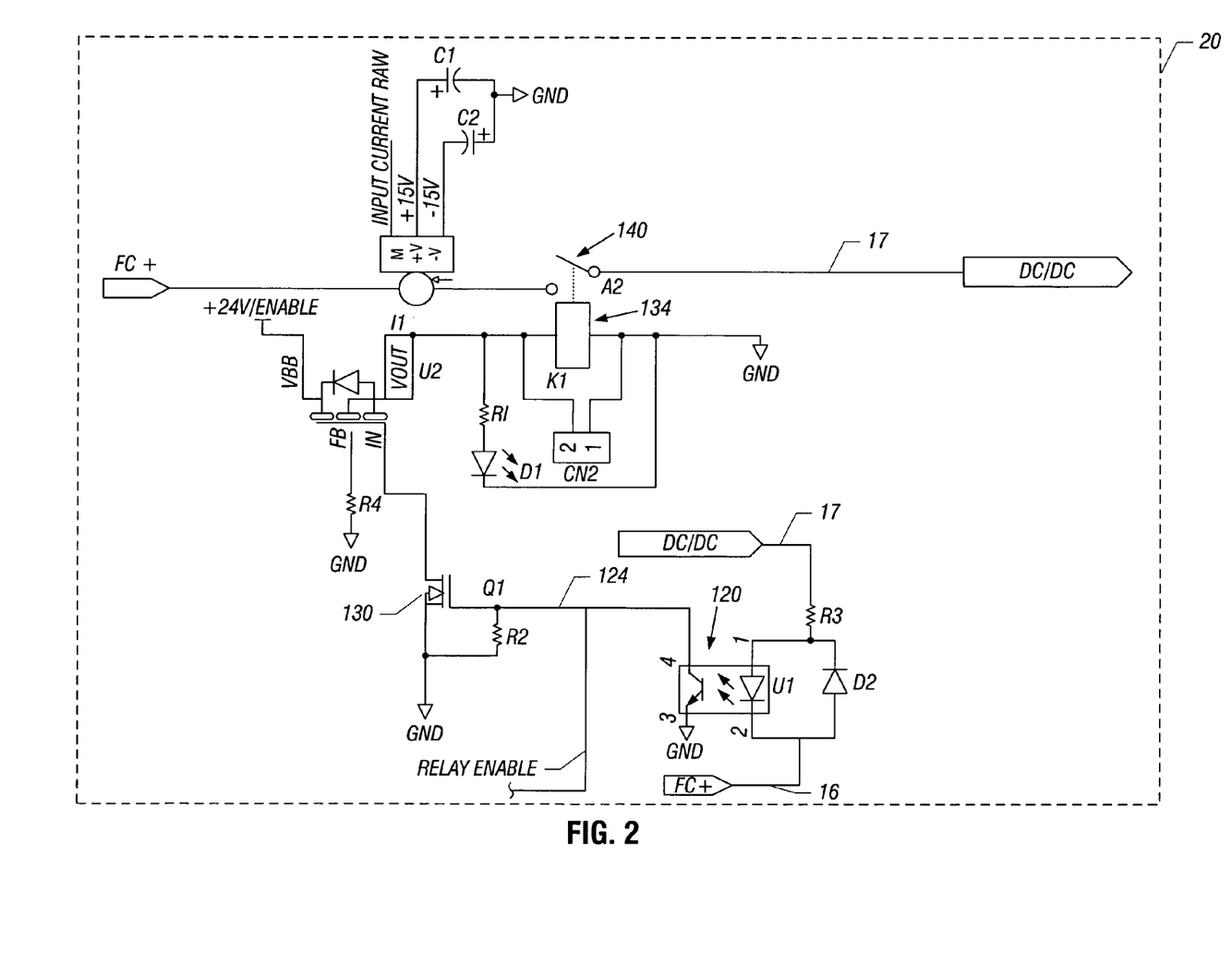
FIG. 2 is a schematic diagram of a switch of a power communication path of the system of FIG. 1 according to embodiments of the invention.

Turning now to the more specific details, FIG. 2 depicts a schematic diagram of the switch 20 in accordance with some embodiments of the invention. The switch 20 includes a switching element 140, which may be formed by, for example, the switching contacts of a relay that includes a coil 134. The coil 134 is energized to close the switching element 140 (to therefore close the switch 20) when a signal called "RELAY ENABLE" is asserted (a logic one state, for example). The RELAY ENABLE signal is communicated over a relay enable line 124, which extends to various protection circuits (described below) that may de-assert (drive low, for example) the RELAY ENABLE signal should one of the fault production circuits detect a fault condition. If the RELAY ENABLE signal is asserted, then a metal-oxide-semiconductor field-effect-transistor (MOSFET) 130 is activated. This energizes the coil 134. When the RELAY ENABLE signal is de-asserted, the MOSFET 130 is turned off, which de-energizes the coil 134 to open the switching element 140 and thus, open the switch 20.

The switching element 140 is electrically coupled between the output terminal 16 of the fuel cell module 12 and the input terminal 17 of the switch mode power stage 24. As depicted in FIG. 2, the output terminal 16 communicates a voltage called "FC+," and the input terminal 17 communicates a signal called "DC/DC+." In accordance with some embodiments of the invention, the switch 20 couples the fuel cell module 12 to the switch mode power stage 24 before the fuel cell module 12 has ramped up to normal operation. This allows the input capacitors of the switch mode power stage 24 to charge up at the same time with the fuel cell stack voltage, thereby eliminating the need for special inrush circuitry. However, certain measures are in place to ensure that the switch 20 is not closed should certain conditions arise.

For example, in accordance with some embodiments of the invention, the switch 20 includes circuitry that maintains the switching element 140 open if the DC/DC+ voltage is higher than the fuel cell voltage FC+. More specifically, the circuitry may include, for example, an optical isolation device 120, which is electrically coupled between the terminals 17 and 16. The device 120 is coupled to the line 124, which communicates the RELAY ENABLE signal. If the DC/DC+ voltage is higher than the FC+voltage, then the optical isolation device 120 is energized, which causes the de-assertion of the RELAY ENABLE signal, thereby placing/maintaining the switching element 140 in an open state. If, however, the DC/DC+ voltage is lower than the FC+voltage, then the optical isolation device 120 is not energized, to thereby allow the RELAY ENABLE signal to remain asserted, assuming no other circuit de-asserts this signal.

Among the other features, in accordance with some embodiments of the invention, the switch 20 may include a current sensor 144, which is coupled between the terminal 16 and the switch element 140 for purposes of sensing an input current (called "INPUT CURRENT RAW"), which is communicated on a communication line 146 and may be further processed by the controller 30.

Figure 3A:
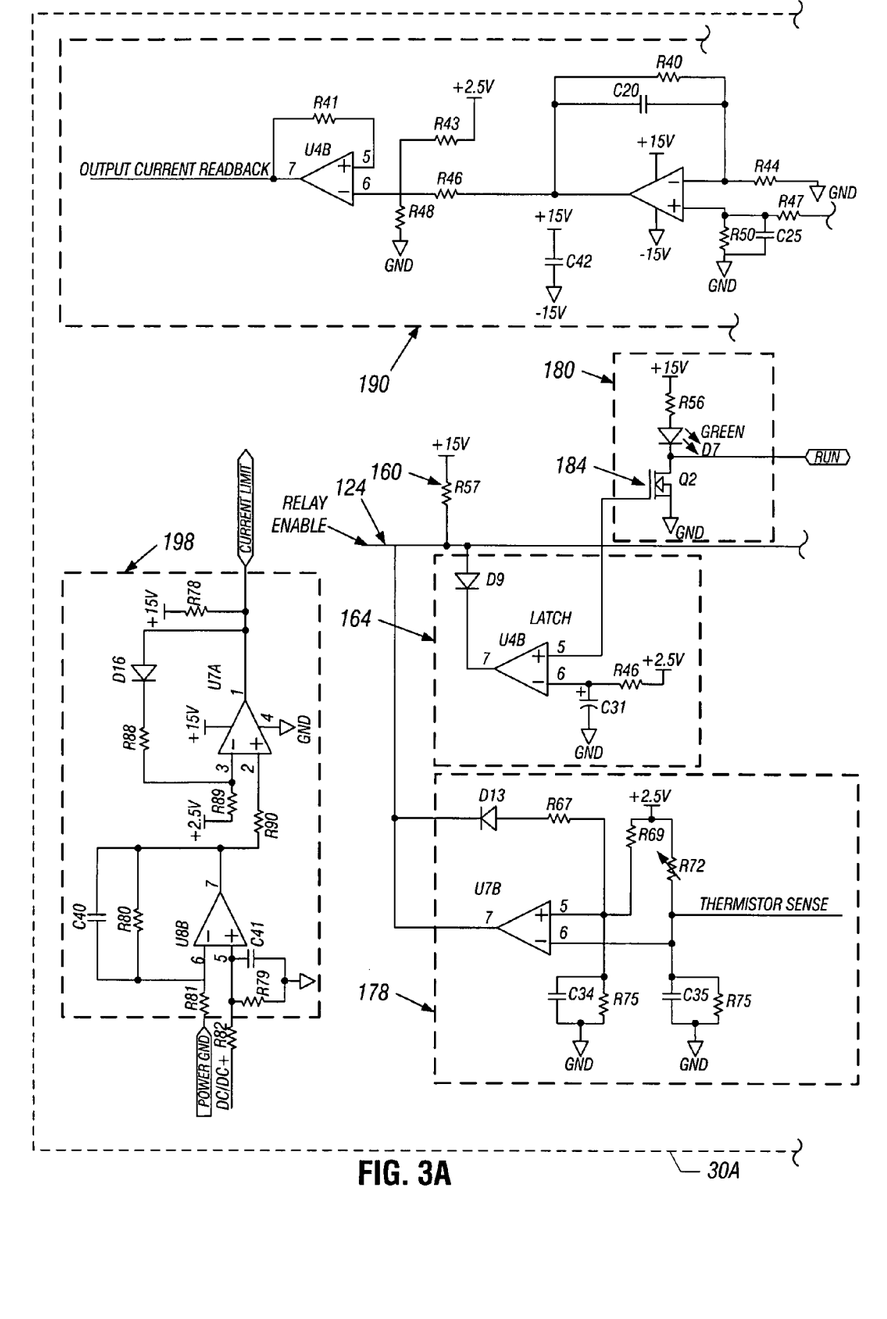
FIGS. 3A, 3B, 4A and 4B are schematic diagrams depicting circuitry of a power stage controller of the system of FIG. 1 according to an embodiment of the invention.
Figure 3B:
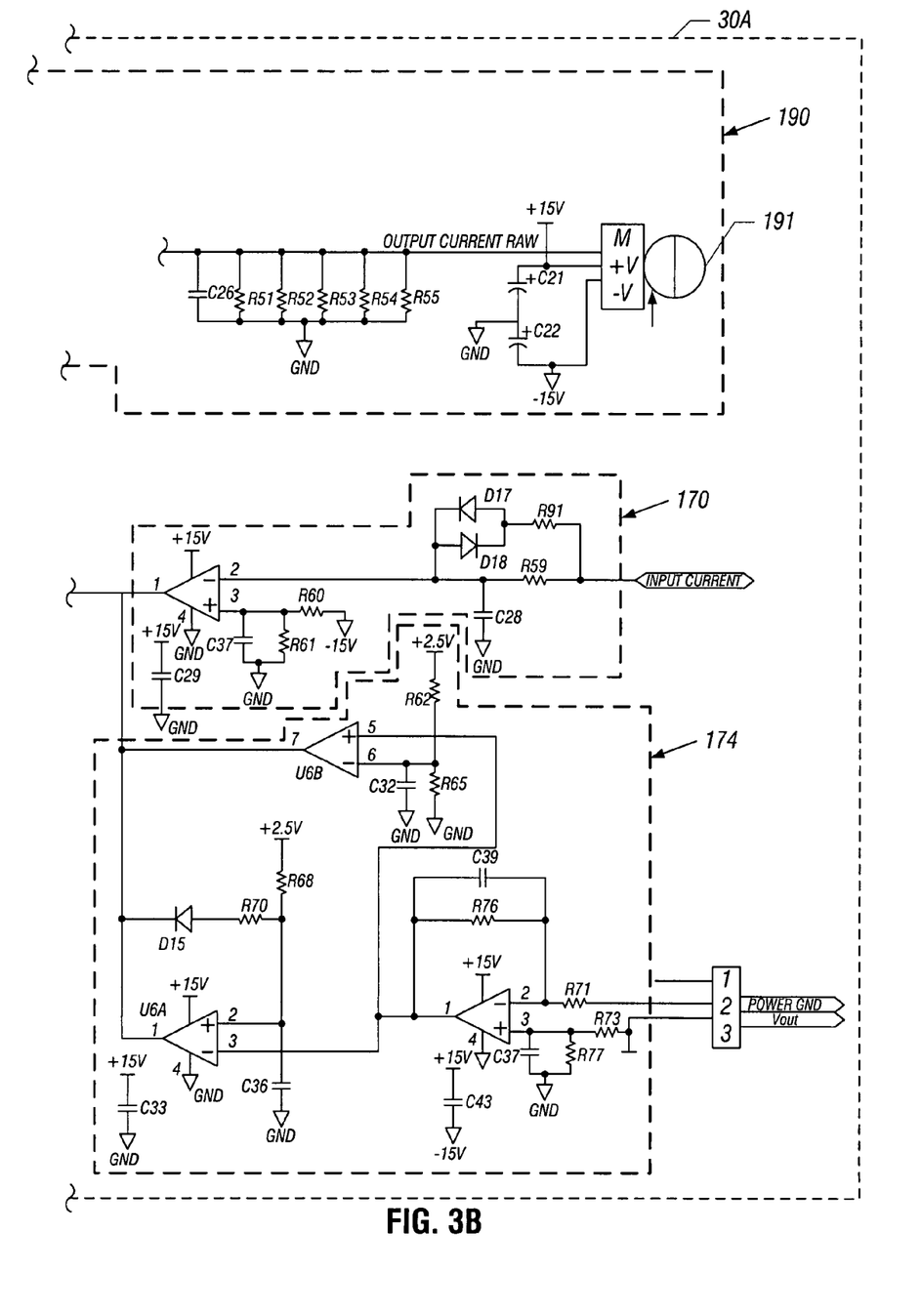

FIGS. 3A and 3B depict a portion 30A of the controller 30 in accordance with some embodiments of the invention. The relay enable line 124 is kept normally asserted (i.e., the RELAY ENABLE signal is normally asserted) by a resistor 160 that electrically couples the line 124 to a positive supply voltage. In accordance with some embodiments of the invention, the controller 30 also includes a latch 164 to latch a particular state of the RELAY ENABLE signal until changed by other circuitry that is coupled to the line 124. As depicted in FIGS. 3A and 3B, the controller 30 includes various comparators circuits that are connected to the relay enable line 124 and are each configured to de-assert the RELAY ENABLE signal should a fault condition be detected for purposes of opening the switch 20.

As a more specific example, in accordance with embodiments of the invention, the controller 30 includes comparator circuitry 174, which receives the output voltage (called $V_{OUT}$) of the switch mode power stage 24 for purposes of detecting whether the $V_{OUT}$ voltage has exceeded a minimum or maximum voltage threshold. In other words, the comparator circuitry 174 determines whether the $V_{OUT}$ voltage has gone beyond its operating boundaries. Therefore, if the $V_{OUT}$ voltage is either above a maximum voltage threshold or below a minimum voltage threshold, the comparator circuitry 174 de-asserts the RELAY ENABLE signal.

The controller 30 also includes a comparator circuit 170, which de-asserts the relay enable line 124 upon detecting a reverse current scenario, in which current is flowing in a reverse direction from the switch mode power stage 24 to the fuel cell module 12.

As another example, the controller 30 may include comparator circuitry 178 for purposes of monitoring the temperature of the switch mode power stage 24. In this regard, the comparator circuitry 178 receives a signal called "THERMISTOR SENSE," which indicates the temperature of the switch mode power stage 24. When the THERMISTOR SENSE signal exceeds a predefined threshold, the comparator circuitry 178 de-asserts the relay enable line 124.

The controller 30 may include additional circuitry for purposes of processing signals received from the switch mode power stage 24 to convert these signals into the appropriate form for either the other portion 30B (see FIGS. 4A-4B) of the controller 30 or for the system controller 60 (see FIG. 1). For example, in accordance with some embodiments of the invention, the controller 30 includes an amplifier 190, which receives the OUTPUT CURRENT RAW signal from the current sensor 191 and filters and amplifies the signal to produce a signal called "OUTPUT CURRENT READBACK," which is furnished to the system controller 60.

In accordance with some embodiments of the invention, the controller 30 may include a circuit 198 which produces a signal called "CURRENT LIMIT," which indicates (when asserted) that current limiting is to be imposed. In this regard, assertion of the CURRENT LIMIT signal limits the current from the fuel cell module 12 after the fuel cell stack voltage falls under a safe threshold. Assertion of the CURRENT LIMIT signal effectively brings the fuel cell stack current down close to zero amps and prevents cell reversal at the same time.

Among the other features that are depicted in FIGS. 3A and 3B, the controller 30 may include circuitry 180, which includes a MOSFET 184 to generate a signal called "RUN" that indicates the status of the RELAY ENABLE signal. In this regard, a PWM controller 220 (see FIGS. 4A-4B) of the controller 30 is enabled when the RUN signal is asserted and disabled otherwise. Due to this feature, when the switch 20 is open, the controller 30 ceases controlling operation of the switch mode power stage 24.

Figure 4A:
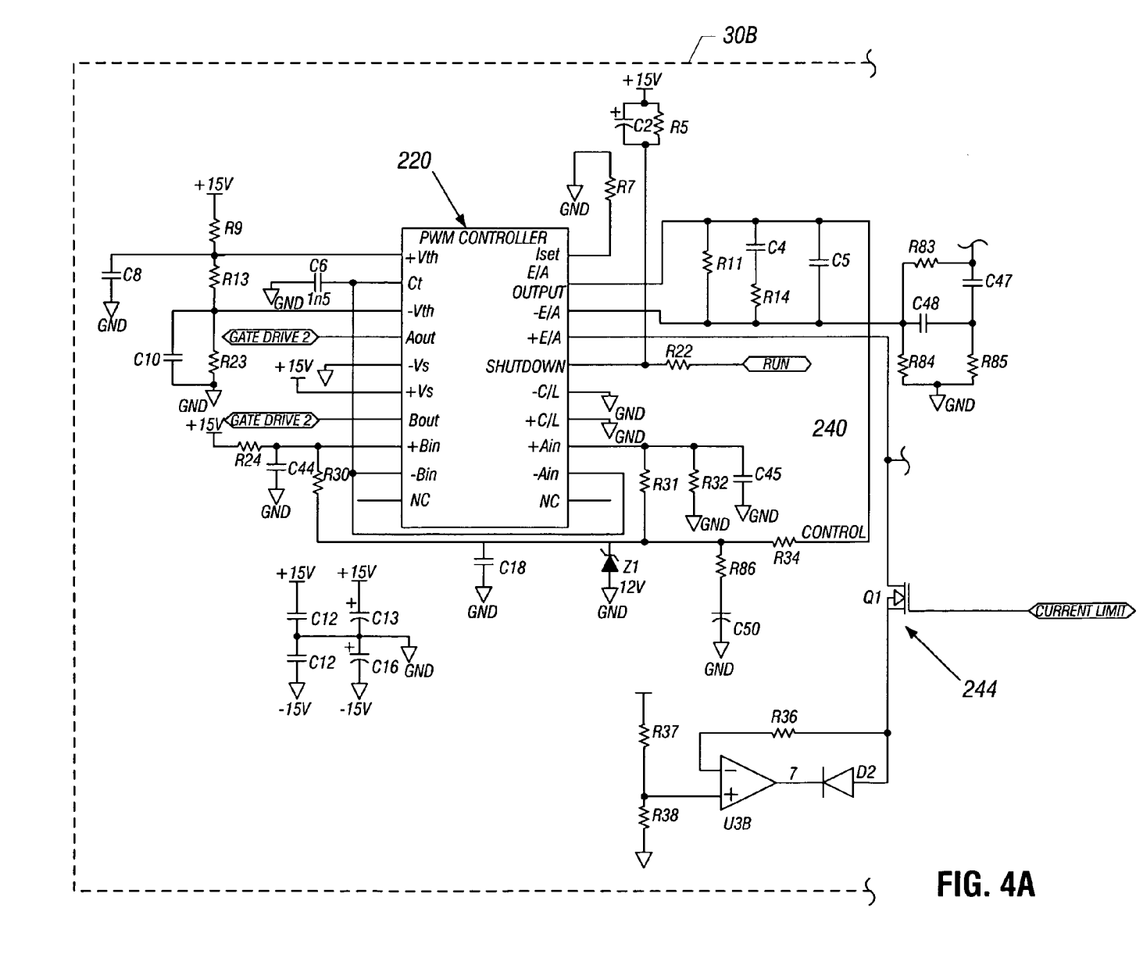
Figure 4B:
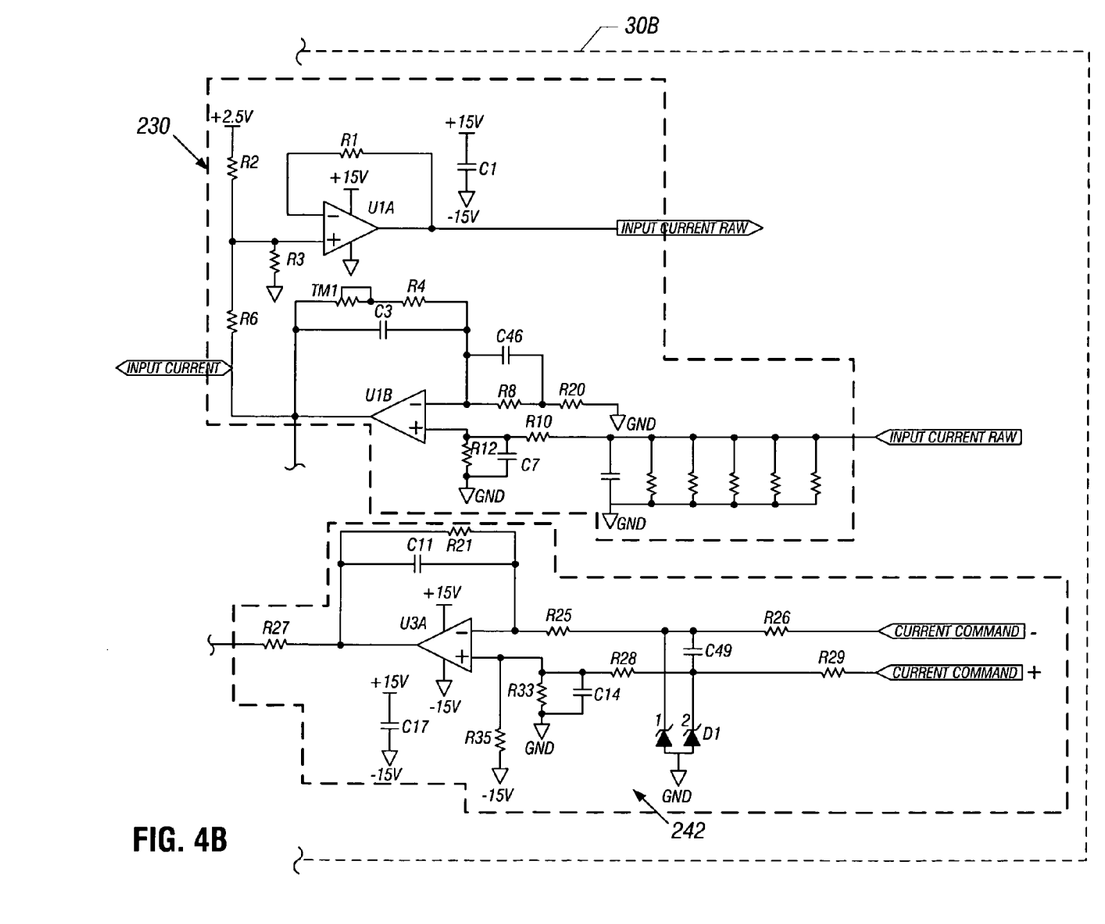

FIGS. 4A-4B generally depict another part 30B of the controller 30 in accordance with some embodiments of the invention. As shown in FIGS. 3A-3B, the controller 30 may include the PWM controller 220, which generates PWM signals called "GATE_DRIVE 1 and GATE_DRIVE 2," which are provided to the switch mode power stage 24. The duty cycles of the GATE_DRIVE 1 and GATE_DRIVE 2 signals are controlled in response to feedback from current sensor 144 and CURRENT_COMMAND+ and CURRENT_COMMAND- signals, which are received from the system controller 60. In this regard, the controller 30 includes an amplifier 242, which amplifies a difference between the CURRENT_COMMAND- and the CURRENT_COMMAND+ signals to provide a corresponding control signal to an input line 240 to the PWM controller 220. The drain-source path of a MOSFET 244 is also connected to the line 240 for purposes of limiting the current of the power stage 24 when the CURRENT LIMIT signal is asserted. The controller 30 also includes, in accordance with some embodiments of the invention, an amplifier 230 that receives the INPUT CURRENT RAW signal and produces an input current read back signal that is communicated to the controller 60.

Referring back to FIG. 1, similar to the switch mode power stage controller 30, the fuel cell module controller 80 also has a relatively fast response time for purposes of detecting faults in the fuel cell module 12, shutting down valves and other safety related controls of the fuel cell module 12 and possibly opening the switch 20 in the case of a detected fault. In general, the fuel cell module controller 80 receives (via communication lines 50) indications of pressure, temperature, hydrogen safety and supply voltages from the fuel cell module 12. Based on these parameters, the fuel cell module controller 80 determines whether a fault has occurred and controls the appropriate valves and other safety related controls via communication lines 54. The fuel cell module controller 80 may also provide various parameters to the system controller 60 (via communication lines 58), such as fuel cell status, temperature, average voltages, minimum and maximum cell voltages and other operational parameters. As depicted in FIG. 1, the system controller 60 has the capability of selectively enabling and disabling the controllers 30 and 80 via communication lines 81 and 31, respectively.

As also depicted in FIG. 1, the system application controller 60 receives various parameters directly from the fuel cell module 12 and the switch mode power stage 24. For example, the fuel cell module 12 communicates (via communication lines 59) voltage, pressure and flow information to the system controller 60. The switch mode power stage 24 may communicate, as examples, the output voltage of the stage 24, the output current of the stage 24 and its temperature via communication lines 76.

Figure 5:
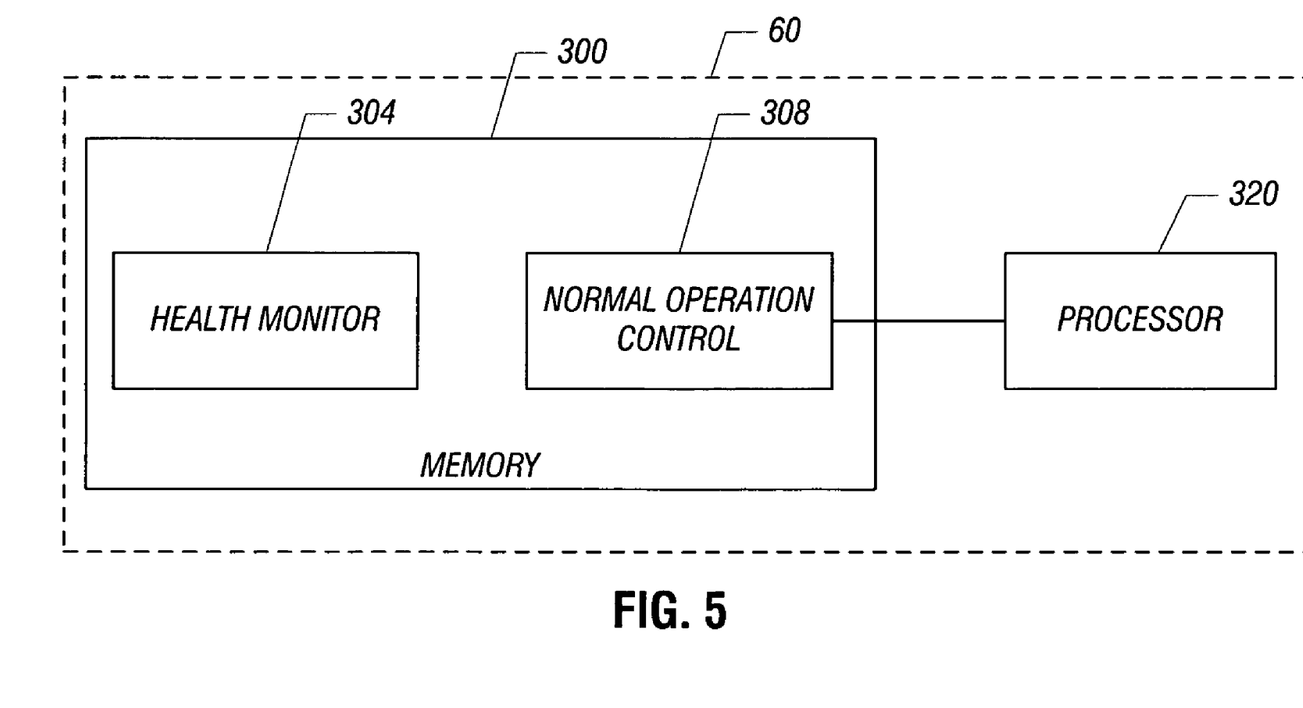
FIG. 5 is a schematic diagram of the system controller of FIG. 1 according to an embodiment of the invention.

Referring to FIG. 5, in accordance with some embodiments of the invention, the controller 60 is primarily implemented in software and includes a processor 320, which executes instructions that are stored in a memory 300. It is noted that the processor 320 may include one or more microprocessors and/or microcontrollers, depending on the particular embodiments of the invention. Furthermore, the memory 300 may represent an internal memory, contiguous memory, external memory, etc., depending on the particular embodiment of the invention. In general, the memory 300 stores instructions 308, which the processor 320 executes during the normal operation of the system 10. Thus, the processor 320, when executing instructions 308, generally regulates the stack current, cathode blower, reformer, etc., for purposes of regulating the overall operation of the system 10.

The memory 300 also includes health monitoring instructions 304, which the processor 320 executes for purposes of monitoring the system 10 for various faults. It is noted that these faults are associated with more slowly varying variables than the variables monitored by the controllers 80 and 30. The slowly-varying variables may include, for example, variables that indicate an input current demand and input current read back mismatch, and variables that are related to stack temperature, pressure, average voltages and other slow variables. In accordance with some embodiments of the invention, the health monitoring function performed by the controller 60 categorizes the system to be in one of three states: normal, re-startable and terminal. In terms of shut down modes, the health monitoring routine causes the processor 320 to form one of three shut downs: soft shutdown, hard shut down and fault shutdown. Soft shutdown is a controlled shutdown. For example, in a controlled shutdown scenario, the fuel cell module 12 properly discharges the fuel cells first. The hard shutdown is a shutdown that responds quickly to fault conditions. For a hard shutdown, the fuel cell module 12 is immediately commanded to turn off the blower and set the fuel cell current to zero and opens the switch 20. The fault shutdown is the fastest response of all shut downs and it is only used in a fatal error, such as when the unit is tipped over.

Warning may also be defined, which gives the operator an indication of a system malfunction and allow operator to fix the malfunction during maintenance. For example, if the output current sensor 191 of the controller 30 is disconnected then the operator is given an opportunity to reconnect the sensor 191.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A system, comprising:
   a fuel cell stack to generate electrical power;
   a power communication path coupled between the fuel cell stack and a load of the system to communicate the electrical power to the load, the power communication path comprising a switch operable to selectively couple the fuel cell stack to the load and isolate the fuel cell stack from the load;
   a first controller having a first response time to control the fuel cell stack and control the power communication path; and
   a second controller having a second response time less than the first response time to monitor the power communication path for a fault condition occurring in the power communication path and take corrective action in response to detecting the fault condition.

2. The system of claim 1, wherein the second controller is adapted to open the switch to halt the communication of electrical power through the power communication path in response to detecting the fault condition.

3. The system of claim 1, wherein the second response time is approximately one hundredth of the first response time.

4. The system of claim 1, wherein the first controller primarily comprises a processor to execute software instructions to control the fuel cell stack and the power communication path and the second controller primarily comprises hardware that does not execute instructions to monitor the power communication path for a fault condition and take corrective action in response to detecting the fault condition.

5. The system of claim 4, wherein the power conditioning circuitry comprises a power stage of a switching regulator.

6. The system of claim 1, wherein the power communication path comprises power conditioning circuitry and the second controller monitors the power conditioning circuitry for a fault condition.

7. The system of claim 1, wherein the second controller is selectively enabled by the first controller.

8. The system of claim 1, wherein the second controller is adapted to monitor for a fault condition selected from the following:
   an output voltage of the power communication path being outside of a predetermined voltage range;
   a current in the power communication path flowing in a reverse direction in the power communication path; and
   a temperature in the power communication path exceeding a predetermined temperature threshold.

9. The system of claim 1, wherein the switch is adapted to prevent closure of the switch in detecting a voltage of the fuel cell being lower than an input voltage of the power communication path.

10. The system of claim 1, further comprising:
    a least one additional controller to monitor a subsystem to the fuel cell system to detect a fault condition and take corrective action in response to the detection of the fault condition, said at least one additional controller having a response time that is significantly less than the first response time of the first controller.

11. The system of claim 10, wherein the said at least one additional controller is adapted to be selectively enabled and disabled by the first controller.

12. The system of claim 10, wherein the subsystem comprises the fuel cell stack.

13. The system of claim 1, wherein the first controller is adapted to detect a fault condition occurring in the fuel cell system and take corrective action in response to the detection of the fault condition.

14. The system of claim 1,
    wherein the fuel cell stack, the power communication path, the first controller and the second controller are part of a motor vehicle.

15. A method, comprising:
    providing a power communication path to communicate electrical power from a fuel cell stack to a load, the power communication path comprising a switch operable to selectively couple the fuel cell stack to the load and isolate the fuel cell stack from the load;
    providing a first controller having a first response time to control the fuel cell stack and control the power communication path; and
    providing a second controller having a second response time less than the first response time to monitor the power communication path for a fault condition in the power communication path and take corrective action in response to detecting the fault condition.

16. The method of claim 15, further comprising:
opening the switch to halt the communication of electrical power through the power communication path in response to the second controller detecting the fault condition.

17. The method of claim 15, wherein the second response time is approximately one hundredth of the first response time.

18. The method of claim 15, wherein the first controller primarily comprises a processor to execute software instructions to control the fuel cell stack and the power communication path and the second controller primarily comprises hardware that does not execute instructions to monitor the power communication path for a fault condition and take corrective action in response to detecting the fault condition.

19. The method of claim 15, further comprising:
using the first controller to selectively enable the second controller.

20. The method of claim 15, wherein the fault condition comprises one of the following:
an output voltage of the power communication path being outside of a predetermined voltage range;
a current in the power communication path flowing in a reverse direction in the power communication path; and
a temperature in the power communication path exceeding a predetermined temperature threshold.

21. The method of claim 15, further comprising:
providing at least one additional controller to monitor a subsystem to the fuel cell system to detect a fault condition and take corrective action in response to the detection of the fault condition, said at least one additional controller having a response time that is significantly less than the first response time of the first controller.

22. The method of claim 21, further comprising:
using the first controller to selectively enable and disable the second controller.

* * * * *